United States Patent
Shetty et al.

(10) Patent No.: US 9,438,699 B1
(45) Date of Patent: *Sep. 6, 2016

(54) TCP PROXYING OF NETWORK SESSIONS MID-FLOW

(71) Applicant: Juniper Networks, Inc., Sunnyvale, CA (US)

(72) Inventors: Nikhil G. Shetty, San Jose, CA (US); Chitrak K. Ojha, San Jose, CA (US); Rohini Kasturi, Livermore, CA (US); Vijay S. Rajaram, Santa Clara, CA (US); Gopi Krishna, Tracy, CA (US); Venkatesh Badakere Ramachandra, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,002

(22) Filed: Aug. 3, 2015

Related U.S. Application Data

(63) Continuation of application No. 13/632,064, filed on Sep. 30, 2012, now Pat. No. 9,100,236.

(51) Int. Cl.
*G06F 15/16* (2006.01)
*H04L 29/06* (2006.01)
*H04L 29/08* (2006.01)

(52) U.S. Cl.
CPC ............ *H04L 67/42* (2013.01); *H04L 67/1095* (2013.01); *H04L 67/141* (2013.01); *H04L 67/2809* (2013.01); *H04L 69/16* (2013.01)

(58) Field of Classification Search
CPC . H04L 67/42; H04L 67/1095; H04L 67/141; H04L 96/16
See application file for complete search history.

(56) References Cited

U.S. PATENT DOCUMENTS

| 8,339,959 B1 | 12/2012 | Moisand et al. |
| 8,514,756 B1 | 8/2013 | Ramachandra et al. |
| 8,635,326 B1 | 1/2014 | Chaganti et al. |

(Continued)

OTHER PUBLICATIONS

"3GPP TS 23.401—General Packet Radio Service (GPRS) enhancements for Evolved Universal Terrestrial Radio Access Network," Section 4.3.8.1, version 10.0.0, 3rd Generation Partnership Project, Technical Specification Group Services and System Aspects, Jun. 2010, 4 pp.

(Continued)

*Primary Examiner* — Abdelnabi O Musa
(74) *Attorney, Agent, or Firm* — Shumaker & Sieffert, P.A.

(57) ABSTRACT

In one example, an intermediate network device sends packets that advertise a transmission control protocol (TCP) window size of zero bytes to a client device and a server device. The device, after sending the packets, receives a first zero-window probe packet from the client device including data representing a first current sequence number for a client-to-server packet flow of an established network session, and a second zero-window probe packet from the server device including data representing a second current sequence number for a server-to-client packet flow of the network session. The device also initializes a TCP state based on the first and second current sequence numbers, and acts as a TCP proxy for packets following the first zero-window probe packet of the client-to-server packet flow based on the TCP state and packets following the second zero-window probe packet of the server-to-client packet flow based on the TCP state.

26 Claims, 5 Drawing Sheets

(56) References Cited

U.S. PATENT DOCUMENTS

| | | |
|---|---|---|
| 8,650,279 B2 | 2/2014 | Mehta et al. |
| 8,948,174 B2 | 2/2015 | Szyszko et al. |
| 9,100,236 B1 | 8/2015 | Shetty et al. |
| 2004/0153669 A1 | 8/2004 | Yang et al. |
| 2004/0236802 A1 | 11/2004 | Baratakke et al. |
| 2006/0268710 A1* | 11/2006 | Appanna ............... H04L 69/16 370/235 |
| 2007/0110053 A1* | 5/2007 | Soni .................. H04L 63/0263 370/389 |
| 2007/0240209 A1* | 10/2007 | Lewis ................. H04W 80/06 726/15 |
| 2008/0044181 A1 | 2/2008 | Sindhu |
| 2008/0075000 A1* | 3/2008 | Robbins ............... H04L 47/10 370/229 |
| 2008/0225795 A1* | 9/2008 | Sun ................. H04W 36/0011 370/331 |
| 2008/0229137 A1* | 9/2008 | Samuels ............... H04L 69/04 713/600 |
| 2013/0013791 A1* | 1/2013 | Kotecha ............ H04W 28/0231 709/227 |

OTHER PUBLICATIONS

"3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, Jun. 2010, 183 pp.

Prosecution History from U.S. Appl. No. 13/632,064, dated from Oct. 10, 2012 through Jun. 5, 2015, 30 pp.

\* cited by examiner

TCP PROXYING OF NETWORK SESSIONS MID-FLOW

This application is a continuation of U.S. patent application Ser. No. 13/632,064, filed Sep. 30, 2012, the entire content of which is incorporated herein by reference.

TECHNICAL FIELD

This disclosure relates to computer networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower, to which a number of antennas are affixed, and the antennas transmit and receive the data over the particular frequency. Wireless devices, such as cellular or mobile phones, smart phones, camera phones, personal digital assistants (PDAs) and laptop computers, may initiate or otherwise transmit a signal at the particular frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UMTS) architecture, an enhancement of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GPP/2) and the Worldwide Interoperability for Microwave Access (WiMAX) forum.

A typical 3GPP mobile service provider network, or mobile network, includes a core packet-switched network, a transport network, and one or more radio access networks. The core packet-switched network for the mobile network uses a variety of control protocols to authenticate users and establish logical connections, known as bearers, among the many service nodes on a path between a wireless device, attached to one of the radio access networks, and a packet data network (PDN). The service nodes then utilize the bearers, which employ data protocols, to transport subscriber traffic exchanged between the wireless device and the PDN, which may include, for example, the Internet, an enterprise intranet, a layer 3 VPN, and a service provider's private network. Various PDNs provide a variety of packet-based services to wireless devices to enable the wireless devices to exchange service data with application or other servers of the PDNs.

Various network devices are positioned between mobile devices and PDNs. For example, serving gateways (SGWs), PDN gateways (PGWs), or other intermediate devices (such as service devices of a service network) may be positioned between a mobile device and the PDN. In general, such network devices may be referred to as intermediate network devices. Intermediate network devices may also be present in networks other than mobile networks, e.g., conventional computer networks. For example, routers, switches, service devices, gateway devices, firewalls, intrusion detection and prevention devices, and the like are examples of intermediate network devices that need not necessarily be used in a mobile network context.

In some cases, intermediate network devices may be configured to act as transmission control protocol (TCP) proxies. That is, the intermediate network devices may acknowledge received packets to a device from which the packets were received (e.g., a client device) and then forward the received packets to the intended destination (e.g., a server device). This process is performed transparently to the endpoints of the devices. Acting as a TCP proxy allows the intermediate network device to perform certain services, such as security services. For example, by acting as a TCP proxy, the intermediate network device may perform deep-packet inspection to extract deep application-level information and exercise appropriate control, such as charging different applications differently, maintaining analytics of data sessions, or drop sessions or applications that a user is not subscribed to.

When an intermediate network device acting as a TCP proxy becomes inactive (e.g., fails or is intentionally brought down for maintenance), many TCP network sessions may be brought down altogether, and if the TCP state is not synchronized, these connections are lost. The client device then needs to open new connections to restart a corresponding network transaction. This may result in a new intermediate network device receiving data of a previously ongoing session. During a failover state, a conventional intermediate network device generally either allows traffic to pass through unproxied, or drops the traffic. In other cases, backup network devices have been configured to receive large amounts of synchronization data from primary network devices.

SUMMARY

In general, this disclosure describes techniques for an intermediate network device that act as transmission control protocol (TCP) proxy to begin TCP proxying data of a network session mid-flow. As discussed above, conventionally, intermediate network devices acting as TCP proxies, in a failover state, either allow traffic to pass through unproxied, or drop the traffic. This disclosure recognizes that not proxying the traffic introduces a disadvantage in that, for long-lasting connections, a lot of data can pass through uninspected. Likewise, dropping the traffic presents disadvantages in that dropping the traffic may cause a noticeable decrease in performance for end clients, and may result in SYN (synchronization) floods in the network when clients time out and open new connections. This may further cause firewalls and intrusion detection and prevention (IDP) devices to detect and hinder these SYN floods by causing more drops.

Moreover, synchronizing state information to a backup device requires a tremendous amount of data to be passed between a primary network device and a backup network device. For example, each sequence number and each acknowledgement thereof is replicated and sent from the primary network device to the backup network device. This utilizes processing power and network bandwidth that could be used more efficiently. Moreover, if a backup network device does not receive the synchronization information, it may need to perform heuristic methods to determine the correct ordering of data being received. This can be difficult, since the very act of failover may have caused lot of packet loss and initializing the state may be difficult.

In one example, a method includes sending, by an intermediate network device, packets that advertise a transmission control protocol (TCP) window size of zero bytes to a client device and a server device of an established network session. The method further includes, after sending the packets, receiving, by the intermediate network device, a first zero-window probe packet from the client device, wherein the first zero-window probe packet includes data representing a first current sequence number for a client-to-server packet flow of the established network session, and a second zero-window probe packet from the server device, wherein the second zero-window probe packet includes data representing a second current sequence number for a server-to-client packet flow of the established network session. The method further includes initializing a first TCP state for the client-to-server packet flow based on the first current sequence number and a second TCP state for the server-to-client packet flow based on the second current sequence number. The method further includes acting, by the intermediate network device, as a TCP proxy for packets following the first zero-window probe packet of the client-to-server packet flow based on the first TCP state and packets following the second zero-window probe packet of the server-to-client packet flow based on the second TCP state.

In another example, an intermediate network device, positioned between a client device and a server device, includes a plurality of network interfaces configured to send packets that advertise a transmission control protocol (TCP) window size of zero bytes to a client device and a server device of an established network session and receive a first zero-window probe packet from the client device, wherein the first zero-window probe packet includes data representing a first current sequence number for a client-to-server packet flow of the established network session, and a second zero-window probe packet from the server device, wherein the second zero-window probe packet includes data representing a second current sequence number for a server-to-client packet flow of the established network session. The intermediate network device further includes a control unit configured to initialize a first TCP state for the client-to-server packet flow based on the first current sequence number and a second TCP state for the server-to-client packet flow based on the second current sequence number, and to act as a TCP proxy for packets following the first zero-window probe packet of the client-to-server packet flow based on the first TCP state and packets following the second zero-window probe packet of the server-to-client packet flow based on the second TCP state.

In another example, a system includes a primary network device configured to receive a synchronization (SYN) packet from a client device of a network session, a SYN-ACK (acknowledgement) packet from a server device of the network session, and an ACK packet from the client device. The system further includes a backup network device configured to receive data of the network session when the primary network device is no longer active after receiving the SYN packet, the SYN-ACK packet, and the ACK packet of the network session. The backup network device is configured to send packets that advertise a transmission control protocol (TCP) window size of zero bytes to the client device and the server device. The backup network device is further configured to, after sending the packets, receive a first zero-window probe packet from the client device, wherein the first zero-window probe packet includes data representing a first current sequence number for a client-to-server packet flow of the network session, and a second zero-window probe packet from the server device, wherein the second zero-window probe packet includes data representing a second current sequence number for a server-to-client packet flow of the network session. The backup network device is further configured to initialize a first TCP state for the client-to-server packet flow based on the first current sequence number and a second TCP state for the server-to-client packet flow based on the second current sequence number. The backup network device is further configured to act as a TCP proxy for packets following the first zero-window probe packet of the client-to-server packet flow based on the first TCP state and packets following the second zero-window probe packet of the server-to-client packet flow based on the second TCP state.

In another example, a computer-readable medium, such as a computer-readable storage medium, contains, e.g., is encoded with, instructions that cause a programmable processor of an intermediate network device to send packets that advertise a transmission control protocol (TCP) window size of zero bytes to a client device and a server device of an established network session. The instructions further cause the processor to, after sending the packets, receive a first zero-window probe packet from the client device, wherein the first zero-window probe packet includes data representing a first current sequence number for a client-to-server packet flow of the established network session, and a second zero-window probe packet from the server device, wherein the second zero-window probe packet includes data representing a second current sequence number for a server-to-client packet flow of the established network session. The instructions further cause the processor to initialize a first TCP state for the client-to-server packet flow based on the first current sequence number and a second TCP state for the server-to-client packet flow based on the second current sequence number. The instructions further cause the processor to act as a TCP proxy for packets following the first zero-window probe packet of the client-to-server packet flow based on the first TCP state and packets following the second zero-window probe packet of the server-to-client packet flow based on the second TCP state.

In another example, a computer-readable medium, such as a computer-readable storage medium, contains, e.g., is encoded with, instructions that cause a programmable processor of an intermediate network device to send packets that advertise a transmission control protocol (TCP) window size of zero bytes to a client device and a server device of an established network session, after sending the packets, receive a first zero-window probe packet from the client device, wherein the first zero-window probe packet includes data representing a first current sequence number for a client-to-server packet flow of the established network session, and a second zero-window probe packet from the server device, wherein the second zero-window probe packet includes data representing a second current sequence number for a server-to-client packet flow of the established network session, initialize a first TCP state for the client-to-server packet flow based on the first current sequence number and a second TCP state for the server-to-client packet flow based on the second current sequence number, and act as a TCP proxy for packets following the first zero-window probe packet of the client-to-server packet flow based on the first TCP state and packets following the second zero-window probe packet of the server-to-client packet flow based on the second TCP state.

The techniques of this disclosure may provide one or more advantages. For example, when intermediate devices are configured as primary and backup devices, the primary device need not send synchronizing data to the backup device. Instead, the backup device can use these techniques to independently synchronize TCP state following failover from the primary device. These techniques also conform to conventional TCP behavior, such that the TCP protocol is not broken or violated. Moreover, an intermediate network device need not queue large amounts of data to perform these techniques. In addition, client and server devices of an ongoing network session need not retransmit large amounts of data, which may otherwise result if an intermediate network device were to drop an ongoing network session. Furthermore, the intermediate network device need not re-discover TCP windows, use a TCP slow-start mechanism, or other congestion mechanism to perform the techniques of this disclosure. These techniques also allow long-lived flows (such as file transfer protocol (FTP) flows) to continue to operate. These techniques also do not cause TCP connections to be reset, and active TCP connections may remain alive and maintained as established.

The details of one or more examples are set forth in the accompanying drawings and the description below. Other features, objects, and advantages will be apparent from the description and drawings, and from the claims.

DETAILED DESCRIPTION

Figure 1:
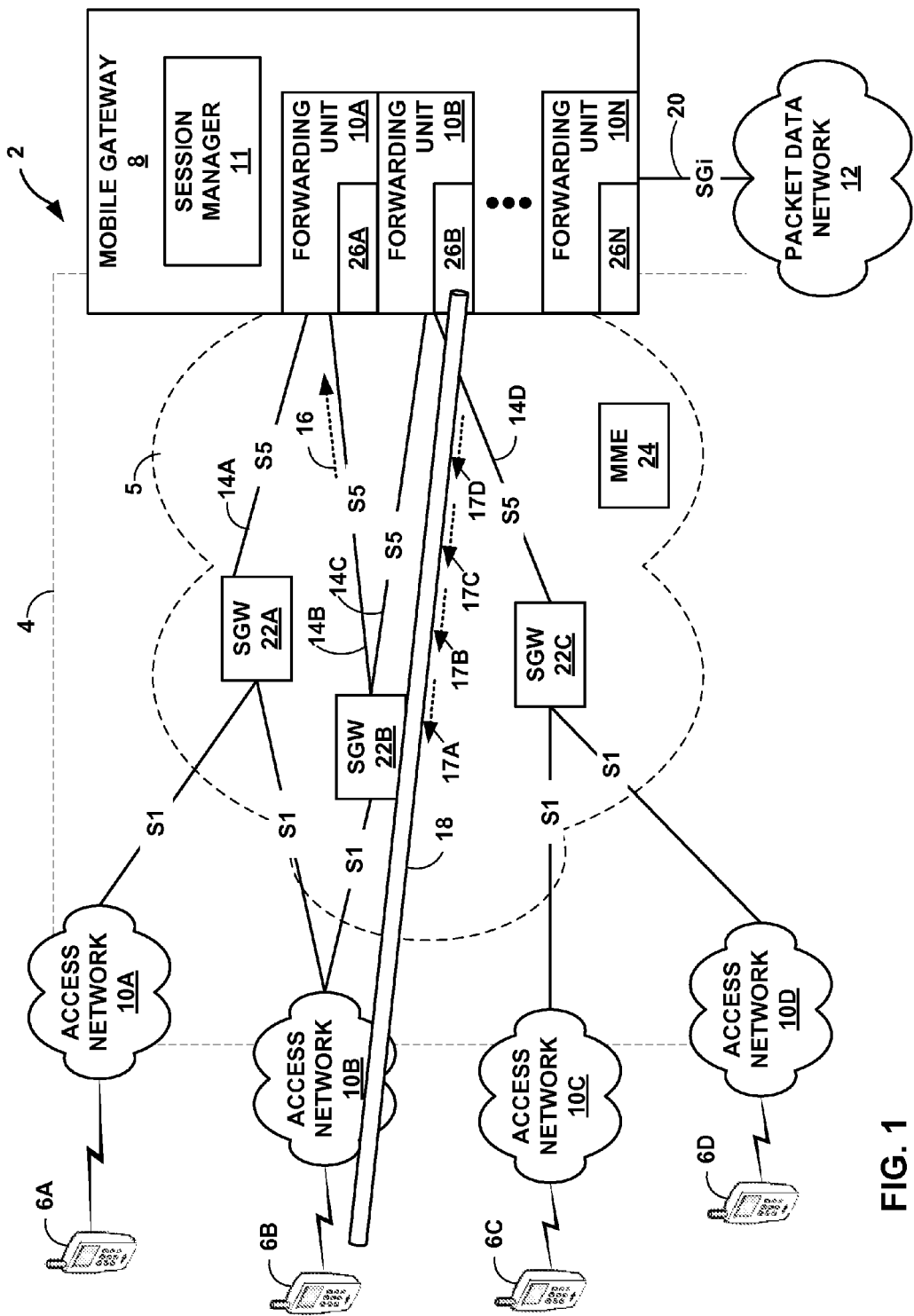
FIG. 1 is a block diagram illustrating an example network system in which a mobile gateway device performs transmission control protocol (TCP) proxying of a network session mid-flow according to the techniques described herein.

FIG. 1 is a block diagram illustrating an example network system 2 in which mobile gateway 8 performs transmission control protocol (TCP) proxying of a network session mid-flow according to the techniques described herein. In this example, network system 2 includes packet data network (PDN) 12 that exchanges traffic with mobile service provider network 4 ("SP network 4") using an SGi interface (or "reference point") with mobile gateway 8 operating over communication link 20. Packet data network 12 supports one or more packet-based services that are available for request and use by wireless devices 6A–6D ("wireless devices 6"). As examples, PDN 12 may provide bulk data delivery, voice over Internet protocol (VoIP), Internet Protocol television (IPTV), Short Messaging Service (SMS), Wireless Application Protocol (WAP) service, or customer-specific application services. Packet data network 12 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates SP network 4, an enterprise IP network, or some combination thereof. In various examples, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Each of wireless devices 6 is a wireless communication device for a subscriber (alternatively, a "subscriber device" or "mobile device") and may represent, for example, a mobile telephone, a laptop or desktop computer having, e.g., a 3G/4G wireless card, a wireless-capable netbook, a video game device, a pager, a smart phone, a personal data assistant (PDA), or other such devices. Each of wireless devices 6 may execute one or more applications, such as VoIP clients, video games, videoconferencing, E-mail, and Internet browsers, among others. Certain applications running on wireless device 6 may require access to services offered by PDN 12, such as Internet browsers that require access to the Internet. Wireless devices 6 may also be referred to as User Equipment (UE) or Mobile Stations (MS) and may alternatively be referred to herein as mobile devices.

Mobile service provider network 4, in this example, is a Long Term Evolution (LTE) network that includes an Evolved Packet Core (EPC) network 5 ("core network 5"). Core network 5 is interfaced to access networks 10A–10D, which in this example each represent an Evolved UTRAN (E-UTRAN). SP network 4 enables and transports service data exchanged between wireless device 6 and PDN 12. While illustrated and described with respect to a particular mobile service provider network architecture (an LTE network), SP network 4 may represent any type of content access network that provides network access, data transport and other services to wireless devices 6 communicatively coupled to SP network 4.

In general, SP network 4 may implement any commonly defined cellular network architecture including those defined by standards bodies, such as a Global System for Mobile communication (GSM) Association, a 3$^{rd}$ Generation Partnership Project (3GPP), a 3$^{rd}$ Generation Partnership Project 2 (3GPP/2), an Internet Engineering Task Force (IETF) and a Worldwide Interoperability for Microwave Access (Wi-MAX) forum. For example, SP network 4 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GPP. Mobile service provider network 4 may, alternatively or in conjunction with one of the above, implement a Code Division Multiple Access-2000 ("CDMA2000") or Enhanced Data Rates for GSM Evolution (EDGE) architecture. Mobile service provider network 4 may, again as an alternative or in conjunction with one or more of the above, implement a WiMAX architecture defined by the WiMAX forum. Mobile service provider network 4 may be alternatively referred to herein as a content access network (CAN).

Mobile service provider network 4 provides mobility management, session management, and packet routing and transfer for network system 2. Mobile service provider network 4 establishes and operates bearers to transport user traffic, in the form of PDP packet data units (PDUs), referred to hereinafter as "packets." In general, a bearer is a set of network resources and data transport functions in SP network 4 to deliver user traffic between two network entities. A bearer may include a path, a logical connection, or a physical or wireless connection between two network devices. A bearer may include, for example, an Evolved Packet System (EPS) bearer. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and "3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each of which are hereby incorporated by reference.

Core network 5 of SP network 4 includes mobile gateway 8 logically connected to each of Serving Gateways (SGWs) 22 via S5 interfaces (or "reference points") operating over respective communication links 14A-14D. Mobile gateway 8 is an edge router between mobile SP network 4 and external PDNs, e.g., PDN 12, and hosts packet filtering, lawful interception, and PDP address allocation, among other functionality. As a router, mobile gateway 8 also executes routing protocols to identify routes through SP network 4 or PDN 12 to various destinations.

The S5 interfaces provide protocols to facilitate user plane tunneling and tunnel management between mobile gateway 8 and SGWs 22. The S5 interfaces may implement a user plane protocol stack that includes GPRS Tunneling Protocol-User Plane (GTP-U) executing over User Datagram Protocol/Internet Protocol (UDP/IP). The term "communication link," as used herein, includes any form of transport medium, wired or wireless, and can include intermediate nodes such as network devices. SGWs 22 host mobility anchoring, packet routing and forwarding, lawful interception, and other functionality.

Core network 5 additionally includes Mobility Management Entity (MME) 24 logically connected to SGWs 22 via S11 interfaces (not shown in FIG. 1, for ease of illustration). The S11 interface provides protocols with which MME 24 establishes and manages bearers that traverse or terminate at SGWs 22. The S11 interface may implement a control plane protocol stack that includes GTP-Control Plane (GTP-C) executing over UDP/IP. In addition to bearer management and establishment, MME 24 hosts Non-Access Stratum (NAS) signaling, mobile gateway 8 and SGW 22 selection, roaming, and authentication, for instance. In various examples, core network 5 includes different numbers of MMEs, SGWs, and/or PGWs. In different architectures of SP network 4, such as a UTRAN network, Serving GPRS Serving Nodes (SGSNs) may perform the functionality of SGWs 22 and MME 24, and a Gateway GPRS Serving Node (GGSN) may perform functionality of mobile gateway 8 consistent with the techniques of this disclosure. While described with respect to a particular type of LTE node, i.e., a PGW, the techniques are applicable to other types of core network gateways, including GGSNs, SGSNs, aGWs, and SGWs.

SGWs 22 and MME 24 connect to access networks 10 (e.g., U-TRANs) via respective aspects of an S1 interface. Specifically, SGWs 22 logically connect to individual access networks 10 via an S1-U interface operating over a communication link, and MME 24 logically connects to individual access networks 10 via an S1-MME interface operating over a communication link to establish bearers over the S1-U interface between SGWs 22 and access networks 10. Each of access networks 10 may be a radio access network, which in various instances may be a GSM Radio Access Network (GRAN), a WiMAX radio access network, a UMTS Terrestrial Radio Access Network (UTRAN), and/or an evolution of a UTRAN for LTE networks known as an E-UTRAN. Each of access networks 10 may include one or more radio towers, which in the case of E-UTRANs are eNode Bs and in the case of UMTS RANs are Node Bs. Wireless devices 6 communicatively couple to access networks 10 using a Uu interface operating over a radio link in this example.

Mobile service provider network 4 may further include a backhaul or transport network (not shown) that includes land-based transmission lines, frequently leased by a service provider, to transport user and control traffic between wireless devices 6 and mobile gateway 8. The backhaul network also includes network devices such as aggregation devices and routers. Further details of an example content access network for a mobile network are described in U.S. patent application Ser. No. 12/905,771, entitled "COLLECTIVELY ADDRESSING WIRELESS DEVICES," filed Oct. 15, 2010, the entire contents of which are hereby incorporated by reference.

In the illustrated example, mobile gateway 8 represents a PDN Gateway (PGW). However, in various other architectural examples of SP network 4, mobile gateway 8 may represent a Gateway GPRS Serving Node (GGSN) or an Access Gateway (aGW). Mobile gateway 8 may present a uniform interface to downstream nodes, including SGWs 22 and MME 24, to allow the downstream nodes to address subscriber service and/or signaling traffic to the uniform interface rather than separately directing such traffic among multiple devices or multiple control plane entities (e.g., service cards) within a single device. In some instances, the uniform interface is an IP address or other network layer address of mobile gateway 8 that is shared among all control plane entities.

Session manager 11 of mobile gateway 8 establishes subscriber sessions for wireless devices 6 that determine operations performed by the mobile gateway on subscriber packets associated with respective subscriber sessions. In general, a subscriber session is an association between SP network 4 and any of wireless devices 6 that is identifiable by a combination of a wireless device 6 PDP address and an Access Point Name (APN) for a service provided by PDN 12, although SP network 4 may use a default APN where wireless device 6B does not specify an APN. A subscriber session (alternatively referred to herein as a "CAN session" or "session") is thus a service-specific (as specified by the APN) session for a service provided to the associated one of wireless devices 6. In an IP-based SP network 4, a subscriber session is an IP-CAN session.

Upon establishing a subscriber session, mobile gateway 8 performs PGW functionality with respect to the subscriber session, including one or more of packet filtering, lawful interception, IP address allocation (performed during subscriber session establishment), accounting, rate enforcement and traffic shaping, bearer binding to identify bearers to route and forward service packets, packet encapsulation/decapsulation for GTP-U traffic exchanged within bearers, and route lookup of packets' outer IP addresses and packet forwarding.

Mobile gateway 8 includes a decentralized data plane in that data plane functionality and packet forwarding functionality is distributed among a plurality of forwarding units 10A-10N ("forwarding units 10"). Each of forwarding units 10 connects to one or more instances of the various LTE interfaces. For example, forwarding unit 10B implements an S5 interface with SGW 22B and an S5 interface with SGW 22C. As another example, forwarding unit 10A implements an S5 interface with SGW 22A and an S5 interface with SGW 22B. Forwarding units 10N implements an SGi interface for exchanging subscriber data traffic with PDN 12.

Each of forwarding units 10 includes hardware or a combination of hardware and software that forward subscriber traffic, in accordance with forwarding information, from an inbound S5/SGi interface to an outbound S5/SGi interface. One or more physical interface cards (PICs) together with one or more packet processors reside on each of forwarding units 10, which are insertable within a mobile gateway 8 chassis. Each forwarding unit thus presents a network interface for sending and receiving subscriber traffic and also includes packet processing capabilities to enable subscriber data packet processing with respect to subscriber sessions to perform aspects of mobile gateway 8 functionality.

Each of session contexts 26A-26N stored by respective forwarding units 10A-10N represent, for one or more subscriber sessions anchored by the respective forwarding unit, data for session context information (or "session data") that specifies data plane operations for subscriber traffic associated with the subscriber session. Session contexts 26B of forwarding unit 10B stores, for example, context data for one or more subscriber sessions anchored by forwarding units 10B. A forwarding unit "anchors" a subscriber session in the decentralized data plane of mobile gateway 8 by processing subscriber traffic associated with the subscriber session using the context information for the subscriber session to perform the specified data plane operations. Session manager 11 receives associated context information from elements of SP network 4 and/or devices external to the network while establishing a subscriber session.

Any of wireless devices 6 initiates an attach request to attach to SP network 4 to enable service traffic exchange with PDN 12. Elements of SP network 4 notifies mobile gateway 8 of the attach request. In the illustrated example, elements SP network 4 receive a request to create a subscriber session initially issued by subscriber device 6B and send representations of this request to mobile gateway 8. MME 24 receives the attach request from access network 10B, selects SGW 22B to service the session, and directs SGW 22B to send create session request 16 as a Create Session Request message to mobile gateway 8 operating as a PGW of an EPC of an LTE network. In some examples, an SGSN may send a Create PDP Context Request to mobile gateway 8 operating as a GGSN of a GPRS packet-switched network.

Forwarding unit 10A receives create session request 16 and forwards the request to session manager 11 of mobile gateway 8, which establishes a subscriber session for wireless device 6B by executing control protocols to identify and authenticate wireless device 6B (or a subscriber using the device), receive PDP address configuration, and communicate with other elements of SP network 4 to establish bearers to carry user traffic for the wireless device 6B, among other operations. In particular, session manager 11 establishes EPS bearer 18, which may represent a default or dedicated EPS bearer that carries service traffic (alternatively referred to as "subscriber data traffic," "subscriber traffic," or "user traffic") between PDN 12 and wireless device 6B. EPS bearer 18 represents an example of a network tunnel between mobile gateway 8 (e.g., a PDN gateway device) and mobile device 6B, passing through SGW 22B.

Session manager 11 receives or generates, while establishing the new subscriber session, session context information that associates subscriber data traffic for the session with one or more bearers and further defines other packet processing operations to be applied by one of forwarding units 10 to the subscriber data traffic. Session manager 11 additionally selects one of forwarding units 10 to anchor the new subscriber session to reduce a number of internal forwarding hops for subscriber traffic associated with the subscriber session among forwarding units 10.

As noted above, EPS bearer 18 represents an example of a network tunnel from mobile gateway 8 (a PGW device, in the example of FIG. 1) to mobile device 6B. FIG. 1 illustrates packets 17A, 17B, 17C, and 17D (packets 17) in transit via EPS bearer 18. In accordance with the techniques of this disclosure, mobile gateway 8 is configured to act as a TCP proxy with respect to packets, such as packets 17, flowing between wireless device 6B and a server, such as a server of packet data network 12. That is, forwarding units 10 of mobile gateway 8 may include hardware, software, and/or firmware for performing TCP proxying. It is presumed that mobile gateway 8 include requisite hardware (such as one or more processing units) to execute instructions stored as software or firmware. In addition, mobile gateway 8 may be configured to perform other techniques coincident with TCP proxying, such as deep packet inspection. In particular, such techniques may require in-order delivery of packets, and mobile gateway 8 may utilize TCP proxying to ensure in-order delivery of packets to perform these techniques. In-order delivery generally corresponds to ordering the packets in sequence number order for the corresponding packet flow.

TCP proxying generally allows data of a network session to be delivered to a separate unit or module (e.g., a deep packet inspection unit or module) in-order. For applications such as deep packet inspection, in-order delivery is important to correctly identify signatures of network attacks. Accordingly, mobile gateway 8 may act as a TCP proxy to provide in-order delivery of packets to the separate unit or module.

For purposes of example, this disclosure describes mobile gateway 8 as performing TCP proxying. However, in general, the techniques of this disclosure related to TCP proxying may be performed by any intermediate network device that receives packets of a network session, that is, packets of both a client-to-server packet flow and a server-to-client packet flow forming the network session. For example, any or all of SGWs 22 may be configured to perform the techniques of this disclosure. Alternatively, a router or other intermediate network device along a dedicated path, such as EPS bearer 18, may be configured to perform the techniques of this disclosure.

Mobile gateway 8, in the example of FIG. 1, represents an example of an intermediate network device between mobile device 6B and a server device, such as a server device of packet data network 12 (which, again, may represent the Internet). Mobile gateway 8 may be configured to act as a backup network device to a primary network device, e.g., a primary mobile gateway (not shown in FIG. 1). Thus, originally, packets of a network session for mobile device 6B may flow through the primary mobile gateway, and in response to the primary mobile gateway becoming inactive (e.g., failing, being taken offline for service, or the like, generally referred to as a "failover event"), packets of established network sessions flowing through the primary mobile gateway may instead begin flowing through mobile gateway 8. In particular, routers of packet data network 12 and SGWs 22 may determine that the primary mobile gateway is no longer active, and begin forwarding packets originally destined for the primary mobile gateway instead to mobile gateway 8. In response to such a failover event, mobile gateway 8 may begin performing the techniques of this disclosure to act as a TCP proxy with respect to the packets of a previously established network session, such as a network session between mobile device 6B and a server device of packet data network 12.

Alternatively, in other examples, the network session may have originally flowed through mobile gateway 8, and mobile gateway 8 may have originally determined that the network session did not need TCP proxying, but later, after the network session had already been established, that the network session should be TCP proxied. Deep packet inspection requires a TCP proxy to reorder the TCP flow and decipher application data. However, since TCP proxies are expensive and take up a lot of resources on the device, it may make sense to transmit data using shallow packet inspection at most times. A decision module of mobile gateway 8 may receive data defining one or more triggers that mobile gateway 8 uses to determine whether to perform deep or shallow packet inspection. These triggers can be traffic-based, like a user running out of prepaid quota, or can be configuration-based, like a policy change for a subscriber. For long-lasting TCP connections, this may result in the connection being intercepted mid-flow. Bringing down these long-lasting TCP connections may not be acceptable in most cases, because it can result in poor end-user performance.

Mobile gateway 8 may generally use the techniques of this disclosure to begin TCP proxying for a previously established network session, without forcing the network session to restart. That is, mobile gateway 8 may use the techniques of this disclosure to begin TCP proxying a previously established network session whether in response to a failover event of a primary network device for which mobile gateway 8 is acting as a backup, or whether mobile gateway 8 had originally determined not to perform TCP proxying for a particular network session but subsequently determined that TCP proxying for the network session is necessary.

A network session between mobile device 6B and a server device of packet data network 12 represents an example of a TCP connection. That is, the network session may utilize TCP for transport layer (layer 4 of the open systems interconnection (OSI) model) services. Mobile gateway 8 may be configured to utilize the techniques of this disclosure to intercept the TCP connection mid-flow, in order to perform TCP proxying. For example, as noted above, mobile gateway 8 may act as a backup device relative to a primary device, such as a primary mobile gateway (not shown). Thus, the primary mobile gateway may perform TCP proxying for a network session originally, but mid-flow, the primary mobile gateway may become inactive, and mobile gateway 8 may resume TCP proxying of the network session on behalf of the primary mobile gateway.

Alternatively, the network connection may originally begin by passing through mobile gateway 8, but mobile gateway 8 may determine, when the network session begins, that TCP proxying of the network session is not necessary. However, at a later point, mobile gateway 8 may determine that TCP proxying of the network session is necessary. These techniques may be used in this situation as well. In some cases, it may be desirable to begin performing TCP proxying mid-flow on a "long-lasting" TCP connection, such as a TCP connection involving an email server, a peer-to-peer client, a web search provider connection, an ad network connection, or a social network connection. For example, mobile gateway 8 may determine to perform deep packet inspection on packets for these types of network sessions after some sort of trigger, such as after a certain amount of data has been exchanged, after the network session has exceeded a time limit, if the data rate (that is, the amount of data exchanged over a particular period of time) has exceeded a corresponding data rate threshold, configuration data with respect to a user corresponding to mobile device 6B has changed, or the like.

A TCP connection is considered to be intercepted mid-flow when a 3-way handshake for the corresponding network session has already been completed. The 3-way handshake generally includes a client sending a SYN packet to a server, the server responding with a SYN-ACK packet, and the client responding with an ACK packet. The 3-way handshake allows intermediate devices to initialize their state for the TCP connection using the sequence numbers passed between the source and the destination. If any TCP connection is peeked into after this point, the sequence numbers immediately seen for the first packet is not assured to initialize the connection. This is because packets in the connection can get dropped and this first packet may really be an out of order packet. Intercepting such connections can result in a deadlock state with the intermediate device expecting certain packets to arrive next while the end sources may not really send those packets.

To avoid such deadlock situations, the techniques of this disclosure utilize the zero-window handling of the TCP protocol. These techniques generally involve two phases. Using mobile gateway 8 as an example of an intermediate device that may utilize these techniques, in the first phase, mobile gateway 8 may forward all packets of a network session between mobile device 6B and a server device of packet data network 12, except that mobile gateway 8 replaces an advertised receiver window in a header portion of each packet with a value of 0 in all the packets (both data packets and ACK packets). Mobile gateway 8 also stores data representing the smallest advertised window for each direction.

When the end-points of these packets (e.g., mobile device 6B and the server of packet data network 12) observe zero-window packets, they close their transmit window and start a timer (sometimes referred to as a "persist timer"), per the TCP protocol. This is the where phase 2 begins on mobile gateway 8, acting as the intermediate device. When the timer fires on the end-points, the end-points send 1-byte zero-window probes toward the opposite end of the connection to check if the window has opened. That is, mobile device 6B sends a 1-byte zero-window probe to the server of packet data network 12, while the server sends a 1-byte zero-window probe to mobile device 6B. At this time, mobile gateway 8 captures these zero-window probes and uses the sequence numbers in the respective zero-window probes to initialize its internally monitored TCP state for the network session, similar to the SYN-SYNACK packets of the original 3-way handshake. After mobile gateway 8 receives the zero-window probes from both ends of the network session, mobile gateway 8 sends ACKs for the zero-window probes to both sides of the network session, where the ACKs include a non-zero receiver window size representative of the data that was stored during the phase 1 packet modifications. After this point, the end-points begin data transmission as usual, and mobile gateway 8 has all the necessary state information to obtain the data in correct order and deliver it to the desired application/parser (e.g., a deep packet inspection module or unit) in order.

In this manner, mobile gateway 8 uses the packet sequence numbers of the zero-window probes to initialize TCP state for a network connection that mobile gateway 8 began monitoring (e.g., acting as a TCP proxy) mid-stream.

After mobile gateway 8 has initialized the TCP state, mobile gateway 8 may begin acting as a TCP proxy for the network session. In particular, mobile gateway 8 may send ACKs to mobile device 6B in response to packets received from mobile device 6B, and forward the packets to the server of packet data network 12. Likewise, mobile gateway 8 may send ACKs to the server of packet data network 12 in response to packets received from the server, and forward the packets to mobile device 6B. Mobile gateway 8 need not forward ACKs of received packets to mobile device 6B or the server of packet data network 12. Moreover, mobile gateway 8 may be configured to perform other techniques coincident with acting as a TCP proxy, such as deep packet inspection.

Although described with respect to mobile gateway 8, it should be understood that the techniques of this disclosure may be performed by other intermediate network devices, e.g., intermediate network devices that are not utilized in the mobile network context. For example, the techniques of this disclosure may be performed by routers, gateways, intrusion detection and prevention (IDP) devices, firewalls, or the like that are not involved in mobile networks. Moreover, the terms "client device" and "server device" may generally refer to any two network devices, where the "client device" sends an initial SYN packet and the "server device" sends a SYN-ACK packet in response to the SYN packet. Thus, the "client device" may in fact correspond to a device that is conventionally considered a server, and the "server device" may in fact correspond to a device that is conventionally considered a client.

Figure 2:
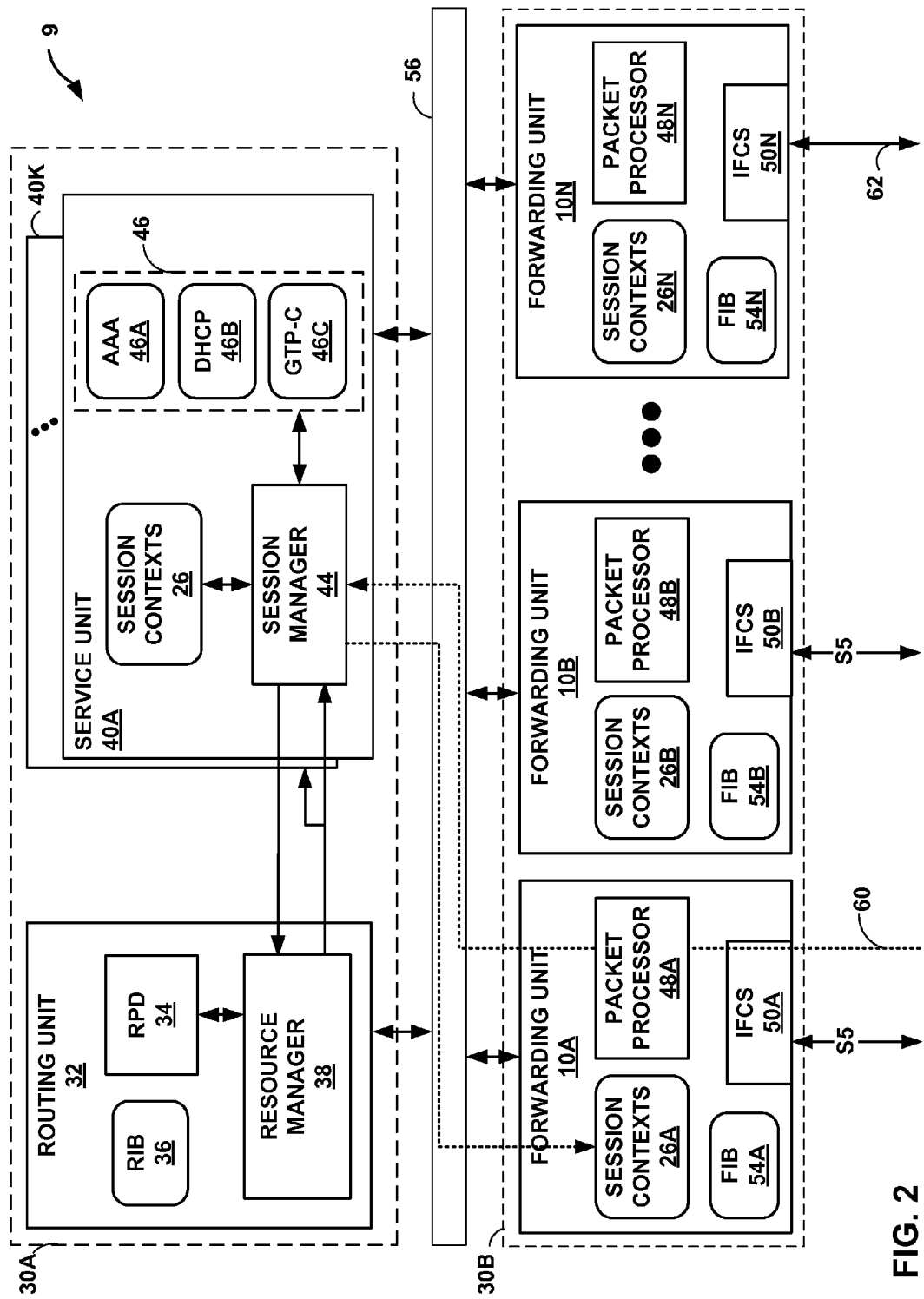
FIG. 2 is a block diagram illustrating an example set of components for an example serving gateway.

FIG. 2 is a block diagram illustrating an example set of components for mobile gateway 9. Mobile gateway 8 of FIG. 1 may include components substantially similar to those of mobile gateway 9 shown in FIG. 2. In this example, mobile gateway 9 is divided into two logical or physical "planes" to include a first control plane 30A and a second "data" or "forwarding" plane 30B. That is, mobile gateway 9 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software to implement the functionality.

Control plane 30A is a decentralized control plane in that control plane functionality is distributed among routing unit 32 and a plurality of subscriber management service units 40A-40K (illustrated as "service units 40"). Similarly, data plane 30B in this example is a distributed data plane in that data plane functionality and packet forwarding functionality is distributed among a plurality of forwarding units 10A-10N ("forwarding units 10"). In some instances, packet forwarding functionality may be consolidated in a single forwarding unit.

Each of routing unit 32, subscriber management service units 40, and forwarding units 10 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, each of routing unit 32, subscriber management service units 40, and forwarding units 10 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Switch 56 couples routing unit 32, subscriber management service units 40, and forwarding units 10 to deliver data units and control messages among the units. Switch 56 may represent an internal switch fabric or cross-bar, bus, or link. Examples of high-speed multi-stage switch fabrics used as a data plane to relay packets between units within a router are described in U.S. Patent Application 2008/0044181, entitled "MULTI-CHASSIS ROUTER WITH MULTIPLEXED OPTICAL INTERCONNECTS." The entire contents of U.S. Patent Application 2008/0044181 are incorporated herein by reference.

Data plane 30B represents hardware or a combination of hardware and software that forward network traffic in accordance with forwarding information. In the example mobile gateway 9 of FIG. 2, data plane 30B includes forwarding units 10 that provide high-speed forwarding of subscriber data traffic received by interface cards 50A-50N ("IFCs 50") via LTE reference points. Interface cards 50A, 50B interface with LTE reference point S5, and forwarding units 10A therefore implement protocol interfaces for user plane tunneling and tunnel management between mobile gateway 9 and an upstream mobile gateway, such as mobile gateway 8. Interface cards 50N connect mobile gateway 9 to an access network, such as one of access networks 10 (FIG. 1) via connection 62.

Forwarding units 10 receive and forward control and data packets via switch 22 along internal forwarding paths to anchoring units for the control and data packets. Forwarding units 10 may each include one or more packet forwarding engines ("PFEs") coupled to respective interface cards 50 and may each represent, for example, a dense port concentrator (DPC), modular port concentrator (MPC), flexible physical interface card (PIC) concentrator (FPC), or another line card, for example, that is insertable within a mobile gateway 9 chassis or combination of chassis. Interface cards 50A, for instance, may therefore include multiple PICs that each includes one or more inbound/outbound interfaces. Each of forwarding units 10 may include substantially similar components to perform substantially similar functionality, said components and functionality being described hereinafter primarily with respect to forwarding unit 10A.

Internally, each of forwarding units 10 may include a unique identifier that identifies the forwarding unit to other components of mobile gateway 9. Forwarding units 10 identifiers may include an index, slot, identifying string, internal IP address, interface identifier such as an outbound interface identifier, or link layer address, for instance. In some examples, inbound and outbound interfaces (e.g., ports) of interface cards 50 may be specified by identifying the port type, a slot in a mobile gateway 9 chassis for the corresponding one of forwarding units 10, a PIC, and a port number. For example, GigE-3/1/2 identifies port 2 of PIC 1 on the one forwarding units 10 that occupies slot 3 in the mobile gateway 9 chassis, and the port is a Gigabit Ethernet port.

Forwarding unit 10A includes a packet processor that receives control and data session traffic via IFC card 50A and, if necessary, internally forwards the traffic to the anchoring one of subscriber management service units 40

(control traffic) or to the anchoring one of forwarding units 10 (data traffic) according to internal routes installed to forwarding information base 54A. Further details regarding internal packet forwarding are found in U.S. patent application Ser. No. 13/248,834, filed Sep. 9, 2011 and entitled "MOBILE GATEWAY HAVING REDUCED FORWARDING STATE FOR ANCHORING MOBILE SUBSCRIBERS," the entire contents of which are hereby incorporated by reference.

Routing unit 32 of control plane 30A executes the routing functionality of mobile gateway 9. In this respect, routing unit 32 represents hardware or a combination of hardware and software of control that implements with routing protocol daemon 34 ("RPD 34") routing protocols by which routing information, stored in a routing information base 36 ("RIB 36"), may be exchanged with other routers. RIB 36 may include information defining a topology of a network, such as core network 5 and/or PDN 12 of FIG. 1. RPD 34 may resolve the topology defined by routing information in RIB 36 to select or determine one or more routes through the network. For each of the selected routes, RPD 34 adds an entry to a route table that specifies, for the selected route, one or more outbound interfaces of various IFCs 50.

The route table may be implemented as a radix tree having nodes that each key to a network address prefix, such as an IPv4/IPv6 network address prefix, and specify an outbound interface for the network address prefix. RPD 34 may then update data plane 30B with this forwarding information directly or via resource manager 38, where forwarding units 10 of data plane 30B store the forwarding information in respective forwarding information bases 54A-54N ("FIBs 54"). Further details of one example of a router can be found in U.S. patent application Ser. No. 12/182,619, filed Jul. 30, 2008 and entitled "STREAMLINED PACKET FORWARDING USING DYNAMIC FILTERS FOR ROUTING AND SECURITY IN A SHARED FORWARDING PLANE," which is incorporated herein by reference.

Resource manager 38 of routing unit 32 allocates and manages resources of mobile gateway 9 among service units 40 and forwarding units 10. In addition, resource manager 38 mediates communication among service units 40 and other components of routing 32, in particular, between session manager 44 and RPD 34 of routing unit 32.

Subscriber management service units 40 of control plane 30A present a uniform interface to downstream devices and provide decentralized subscriber session setup and management for mobile gateway 9. For example, all of subscriber management service units 40 may be addressable by the same IP or other PDP address, and control messages destined for the same IP or other PDP address of subscriber management service units 40 may therefore be handled by any of the service units. Internally, each of subscriber management service units 40 may include a unique identifier that identifies the service unit to other components of mobile gateway 9. Subscriber management service units 40 identifiers may include, for example, an index, slot, identifying string, internal IP address, or link layer address.

Subscriber management service units 40 may each represent, for example, a packet forwarding engine (PFE) or other component of a physical interface card insertable within one or more chassis of mobile gateway 9. The physical interface card may be, for instance, a multi-services dense port concentrator (MS-DPC). One or more of subscriber management service units 40 may also each represent a co-processor executing on a routing node, such as routing unit 32. Subscriber management service units 40 may be alternatively referred to as "service PICs" or "service cards." Each of subscriber management service units 40 includes substantially similar components to perform substantially similar functionality, said components and functionality being described hereinafter with respect to subscriber management service unit 40A (hereinafter, "service unit 40A"). Additional details regarding handling subscriber sessions with a decentralized control plane of multiple subscriber management service units may be found in U.S. patent application Ser. No. 13/172,556, entitled "MOBILE GATEWAY HAVING DECENTRALIZED CONTROL PLANE FOR ANCHORING SUBSCRIBER SESSIONS," filed Jun. 29, 2011, the entire contents of which are hereby incorporated by reference.

Session manager 44 of service unit 40A establishes sessions, requested by a subscriber via a mobile service provider network in which mobile gateway 9 is located, and manages the sessions once established. Each of subscriber management service units 40 includes an instance of session control module 44 and may therefore independently execute control plane protocols 46 required to establish a requested session for a subscriber. In this sense, the subscriber management service units 40 provide a form of a decentralized control plane for managing subscriber communication sessions. As a result, the mobile gateway 9 may achieve increased scalability to handle thousands or millions of concurrent communication sessions from wireless devices.

Session manager 44 receives requests to create or update subscriber sessions and responsively creates or updates the sessions by executing control protocols 46 to receive session context information. In the illustrated example, IFC 50A of forwarding unit 10 receives create session request 60, which packet processor 48A directs to service unit 40A via switch 56 in accordance with internal forwarding information in FIB 54A. To create and anchor the requested session in session contexts 42, session manager 44 authenticates and receives profile information for a subscriber and/or subscriber service identified in the request by executing AAA 46A. Session manager 44 may also request an IP address from a DHCP server for the requested session by executing DHCP 46B. Session manager 44 may also negotiate with other mobile service provider network devices, using GTP-C 46C messages, to create or modify a set of one or more bearers that carry service traffic for the requested session in GTP-U tunnels. In this way, session manager 44 establishes session contexts 42 with session context information for the subscriber session requested by create session request 60. These control protocols are exemplary, and session manager 44 may execute other protocols related to charging, for example, to receive additional session context information for the session.

The new session context stored in session contexts 52 for the request subscriber session stores session context information either generated by or received by mobile gateway 9 by executing control protocols 46. The session context information defines the operations to be performed on subscriber traffic associated with the corresponding subscriber session. Such session context information may include, for example, the PDP (e.g., IP) address allocated by a DHCP server or another entity for the wireless device for use in sending and receiving subscriber packets, forwarding information used by forwarding units 10 in forwarding subscriber packets such as tunnel endpoint identifiers (TEIDs) and identifiers/addresses for downstream service nodes, the Access Point Name (APN) for the session, charging information, and one or more quality of service (QoS) profiles for the associated subscriber.

As control plane anchors for subscriber sessions, subscriber management service units 40 handle configuration of forwarding units 10 for constructing session-specific forwarding paths for processing and forwarding subscriber data traffic associated with the subscriber sessions. Session contexts 26 of forwarding units 10 may each represent a subset of a chain of forwarding next hops that determine the operations applied to associated subscriber data traffic. Example details on subscriber management service units 40 constructing subscriber-specific forwarding paths within forwarding units 10 can be found in Example details on internal forwarding paths of forwarding units 10 can be found in U.S. patent application Ser. No. 13/172,505, entitled "VARIABLE-BASED FORWARDING PATH CONSTRUCTION FOR PACKET PROCESSING WITHIN A NETWORK DEVICE," filed Jun. 29, 2011, the entire contents being incorporated herein by reference.

Any one of forwarding units 10 may operate as an anchoring forwarding unit for a particular one of session contexts 26 to perform forwarding functionality on subscriber packets associated with the corresponding subscriber session. In other words, processing subscriber traffic for each of session contexts 26 may be handled by any of forwarding units 10 (i.e., the anchor forwarding unit). The respective anchor forwarding units for upstream and downstream subscriber traffic for a subscriber session may be the same forwarding unit or different forwarding units.

Packet processors 48A-48N ("packet processors 48") of respective forwarding units 10 apply respective session contexts 26 to packets associated with subscriber sessions anchored in the data plane by the forwarding unit 10 that includes the packet processor. Each of packet processors 48 may represent computational components of a packet forwarding engine or network processor, for instance, and includes one or more general- or special-purpose processors, ASICs, ASSPs, FPGAs, or other programmable logic for forwarding packets in accordance with a corresponding one of FIBs 54 and processing packets in accordance with a corresponding one of session contexts 26. Packet processing operations applied by network processors 48 may include subscriber charging, firewall, protocol demultiplexing, tunnel encapsulation/decapsulation, internal forwarding, quality of service (QoS) policing, and route lookup operations.

Service units 40 and packet processors 48 represent examples of hardware-based processing elements of forwarding units of a mobile gateway. As explained below, service units 40 and/or packet processors 48 may be configured to perform the techniques of this disclosure. Packet processors 48 may be configured to determine whether to begin performing TCP proxying for a network session mid-flow, e.g., in response to a failover event or in response to a trigger firing for a network session. Service units 40 may include a TCP proxy service unit configured to perform TCP proxying for one or more network sessions. In accordance with the techniques of this disclosure, the TCP proxy service unit of service units 40 may be configured to begin TCP proxying for a network session mid-flow, that is, after a TCP 3-way handshake has occurred for the network session. For example, the TCP proxy service unit may begin performing TCP proxying for a network session after failover by a corresponding primary device, e.g., a primary mobile gateway (FIG. 1) that is different from mobile gateway 9. As another example, the TCP proxy service unit may begin performing TCP proxying for an existing network session after one or more of packet processors 48 have passively processed the network session, e.g., in response to a trigger that fires for the network session.

In some examples, packet processors 48 may be configured to begin receiving packets of a network session that were previously processed by a separate mobile gateway, e.g., when the separate mobile gateway is no longer active. For example, the separate mobile gateway may be brought down for service or may fail during service. Mobile gateway 9 may be configured as a backup device to the separate mobile gateway, which may be configured as a primary device with respect to TCP proxying of the network session.

Alternatively, or additionally, packet processors 48 may be configured with configuration data indicating events when the TCP proxy service unit should begin TCP proxying a network session that was not previously being TCP proxied. For example, such events may include when an amount of data for the network session has exceeded a data threshold, when a length of time during which the network session has been active has exceeded a time threshold (e.g., one minute), when a data rate (that is, an amount of data over a particular unit of time) has exceeded a data rate threshold, or when configuration data of mobile gateway 9 indicates that a particular user of a client device is no longer trustworthy, or that traffic associated with a particular user should be monitored, which may include TCP proxying.

Mobile gateway 9 represents an example of an intermediate device through which all data of a particular network session flows. That is, mobile gateway 9 receives all packets of a client-to-server packet flow and a server-to-client packet flow, forming the network session. For example, forwarding unit 10A may receive all packets of the client-to-server packet flow, and FIB 54A may indicate that packets of the client-to-server packet flow are to be sent via switch 56 to forwarding unit 10N. Similarly, FIB 54N of forwarding unit 10N may indicate that packets of the corresponding server-to-client packet flow of the network session are to be sent via switch 56 to forwarding unit 10A. IFCs 50 may likewise forward packets of the client-to-server packet flow to the server device, and packets of the server-to-client packet flow to the client device, of the corresponding network session.

One or more of packet processors 48 may also include respective decision modules that determine whether packets of a particular network session should be TCP proxied. For example, packet processors 48 may be equipped with triggers and/or to cause mobile gateway 9 to respond to a failover event of a corresponding primary network device. In particular, in response to either the failover event or the firing of one of the triggers, packet processors 48 may begin forwarding packets of a corresponding network session to the TCP proxy service unit of service units 40.

The TCP proxy service unit of service units 40 may begin TCP proxying of a network session mid-flow, that is, after a TCP 3-way handshake has already occurred for the network session. In accordance with the techniques of this disclosure, the TCP proxy service unit initially sends packets that advertise a TCP window size of 0 to the client and the server of the network session. This causes both the client and the server to start a timer that stops the output of packets associated with the network session for a period of time. After the period of time elapses, as indicated by expiration of the timer, the client and server forward probe packets. The TCP proxy service unit intercepts these probe packets and extracts sequence numbers from each. In this manner, the TCP proxy service unit determines the current sequence numbers for both the client-to-server packet flow and the service-to-client packet flow. The TCP proxy service unit may then acknowledge receipt of the probe packets, which signals to the client and server that the network session may resume normally.

Service units 40 may also include a service unit that needs packets delivered in-order (that is, in sequence number order). For example, service units 40 may include a deep packet inspection service unit. Accordingly, the TCP proxy service unit may send packets of the network session to the deep packet inspection service unit in order (that is, in TCP sequence number order). Likewise, the deep packet inspection service unit may reassemble application layer data from payloads of the received packets and perform deep packet inspection of the packets. Deep packet inspection may identify malicious network use, such as attempted intrusions, viruses, malware, disruptive traffic, prohibited traffic (e.g., the use of prohibited software), or the like. In response to detection of such malicious network use, the deep packet inspection service unit may cause mobile gateway 9 to drop packets associated with the network session, send an alert to an administrator, send messages to SGW devices indicative of the client and/or server involved in the malicious network use, rate limit the network session, forward or replicate packets of the network session to a particular target (such as a honeypot device), or otherwise take other programmed responses.

Figure 3A:
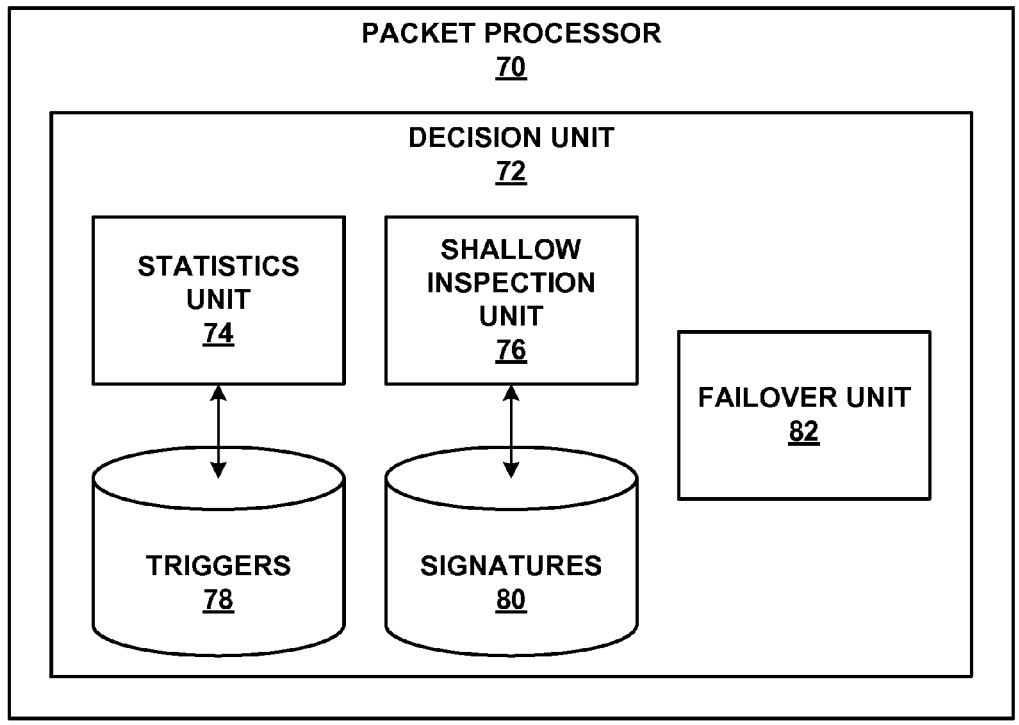
FIGS. 3A and 3B are block diagrams illustrating components of an example serving gateway in greater detail.
Figure 3B:
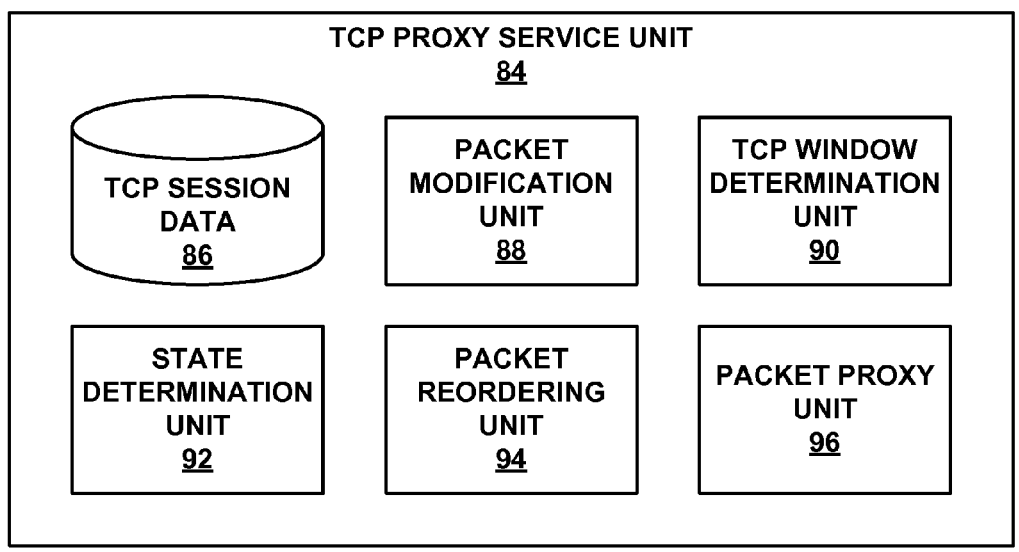

FIGS. 3A and 3B are block diagrams illustrating components of mobile gateway 9 in greater detail. FIG. 3A illustrates an example packet processor 70. Any or all of packet processors 48 of FIG. 2 may include components substantially similar to those of packet processor 70. Packet processor 70 may include components beyond those shown in the example of FIG. 3A. In this example, packet processor 70 includes decision unit 72, which in turn includes statistics unit 74, triggers 78, shallow inspection unit 76, signatures 80, and failover unit 82. In other examples, decision unit 72 may include only failover unit 82, statistics unit 74 and triggers 78, or shallow inspection unit 76 and signatures 80, or any combination thereof.

In general, decision unit 72 determines whether packets of a particular packet flow should be sent to a service unit, such as a TCP proxy service unit, or whether packets should be sent via a switch, such as switch 56 (FIG. 2), to another forwarding unit to be sent toward a destination of the packets. Triggers 78 define one or more triggers for determining whether to send packets of a network session to a TCP proxy service unit. For example, triggers 78 may define a data threshold, indicative of a maximum amount of data of a network session that may be sent before TCP proxying the network session. As another example, triggers 78 may define a time threshold, indicative of a maximum time during which a network session may be active before packets of the network session are TCP proxied. As still another example, triggers 78 may define a data rate threshold, indicative of a maximum amount of data per unit of time allowed for a network session before the network session is TCP proxied.

Statistics unit 74 collects one or more values representative of the various triggers defined by triggers 78. For example, for a trigger defining a data threshold, statistics unit 74 determines an amount of data exchanged for each network session. For a trigger defining a time threshold, statistics unit 74 determines a start time and a current time, as well as a length of time representing the difference between the current time and the start time. For a trigger defining a data rate threshold, statistics unit 74 determines amounts of data exchanged over a relevant unit of time for a network session. Statistics unit 74 may also determine whether the various statistics gathered for a particular network session would cause one or more of triggers 78 to fire, e.g., whether statistics for the network session exceed a relevant threshold. When one of triggers 78 fires, as indicated by statistics unit 74, decision unit 72 may determine that the corresponding network session is to be TCP proxied and inspected.

Shallow inspection unit 76 inspects packets of a network session to determine whether data of the packets matches one or more signatures defined by signatures 80. When data of a network session matches one or more of signatures 80, decision unit 72 may determine that the corresponding network session is to be TCP proxied and inspected.

Failover unit 82 may determine that packet processor 70 is included in an intermediate network device that is configured as a backup network device for a primary network device, e.g., in a high availability cluster. Failover unit 82 may also determine whether received network packets are packets of a packet flow that was previously being processed by the primary network device. Additionally or alternatively, failover unit 82 may be configured to determine whether the primary network device has failed or otherwise become inactive. When packet processor receives packets of a network session that was previously processed by the primary network device, and failover unit 82 determines that the primary network device is inactive, failover unit 82 may determine whether packets of the network session are to be TCP proxied. In some examples, decision unit 72 determines that all packets of network sessions that were previously processed by a primary network device are to be TCP proxied. In other examples, failover event 82 may cause statistics unit 74 and/or shallow inspection unit 76 to determine whether to begin TCP proxying packets of such a network session.

In this manner, decision unit 72 may determine whether to begin TCP proxying packets of a network session after a TCP 3-way handshake has already occurred for the network session. Thus, a corresponding intermediate network device, such as mobile gateway 9, may begin TCP proxying a network session mid-flow, that is, after the TCP 3-way handshake has occurred for the network session.

FIG. 3B is a block diagram illustrating an example TCP proxy service unit 84. TCP proxy service unit 84 may be included within mobile gateway 9 as one of service units 40 (FIG. 2). In this example, TCP proxy service unit 84 includes TCP session data 86, packet modification unit 88, TCP window determination unit 90, state determination unit 92, packet reordering unit 94, and packet proxy unit 96. It should be understood that any or all of the various units of TCP proxy service unit 84 may be functionally integrated, in any combination. The units are shown separately for purposes of explanation.

After TCP proxy service unit 84 receives a packet of a packet flow, TCP proxy service unit 84 determines whether TCP state is initialized, as indicated by data stored in TCP session data 86 for the corresponding TCP session. Assuming that a received packet is of a packet flow for which TCP proxying has only recently begun, TCP session data 86 will not have a current TCP state for the corresponding packet flow. Accordingly, packet modification unit 88, in accordance with the techniques of this disclosure, modifies a TCP header of a packet of the packet flow to advertise a TCP window size of 0. In particular, packet modification unit 88 modifies the TCP window size value of each received packet of the packet flow to have a value of 0. Packet proxy unit 96 then forwards these packets toward the original destination, e.g., the client or server device of the network session.

TCP window determination unit 90 determines a minimum window size advertised in each of the packets of the network session prior to modification by packet modification unit 88. TCP window determination unit 90 records a minimum of the window size values for both the client-to-server packet flow and the server-to-client packet flow of the network session in TCP session data 86. In this manner, TCP window determination unit 90 records a minimum TCP window size for the client-to-server packet flow in TCP session data 86, and a minimum TCP window size for the server-to-client packet flow in TCP session data 86. This data is recorded for each of the packets of the network session for which packet modification unit 88 modifies the TCP window size value to a value of 0.

As discussed above, by setting the TCP window size value to 0, TCP proxy service unit 84 causes the client and server devices of the network session to start timers, to wait to send data of the network session in accordance with the TCP protocol. After the timers expire, the client and server may send probe packets, including a current sequence number. That is, the client may send a probe packet along the client-to-server packet flow including a current sequence number for the client-to-server packet flow. State determination unit 92 may retrieve the current sequence number for the client-to-server packet flow and record this value in TCP session data 86. In a similar manner, state determination unit 92 retrieves a current sequence number for the server-to-client packet flow from a probe packet received from the server.

Packet proxy unit 96 acknowledges receipt of both probe packets from the server and the client, setting the TCP window sizes in the acknowledgements based on the recorded minimum TCP window sizes. For example, packet proxy unit 96 sends an acknowledgement to the server device including the minimum TCP window size from the client-to-server packet flow, recorded in TCP session data 86. Likewise, packet proxy unit 96 sends an acknowledgement to the client device including the minimum TCP window size from the server-to-client packet flow, recorded in TCP session data 86. After receiving the respective acknowledgements, the client and server devices involved in the network session begin sending and receiving data as normal.

Packet proxy unit 96 generally acts on behalf of the client device with respect to packets received from the server of the network session, and acts on behalf of the server device with respect to packets received from the client of the network session. For example, packet proxy unit 96 acknowledges packets received from the client and server device and forwards the packets to the server or client device, respectively. In addition, packet reordering unit 94 reorders packets of the client-to-server packet flow and the server-to-client packet flow and delivers the reordered packets to another service unit, such as a deep packet inspection service unit. In this manner, the other service unit can receive in-order delivery of the packets, which may be important, e.g., in the context of deep packet inspection.

Figure 4A:
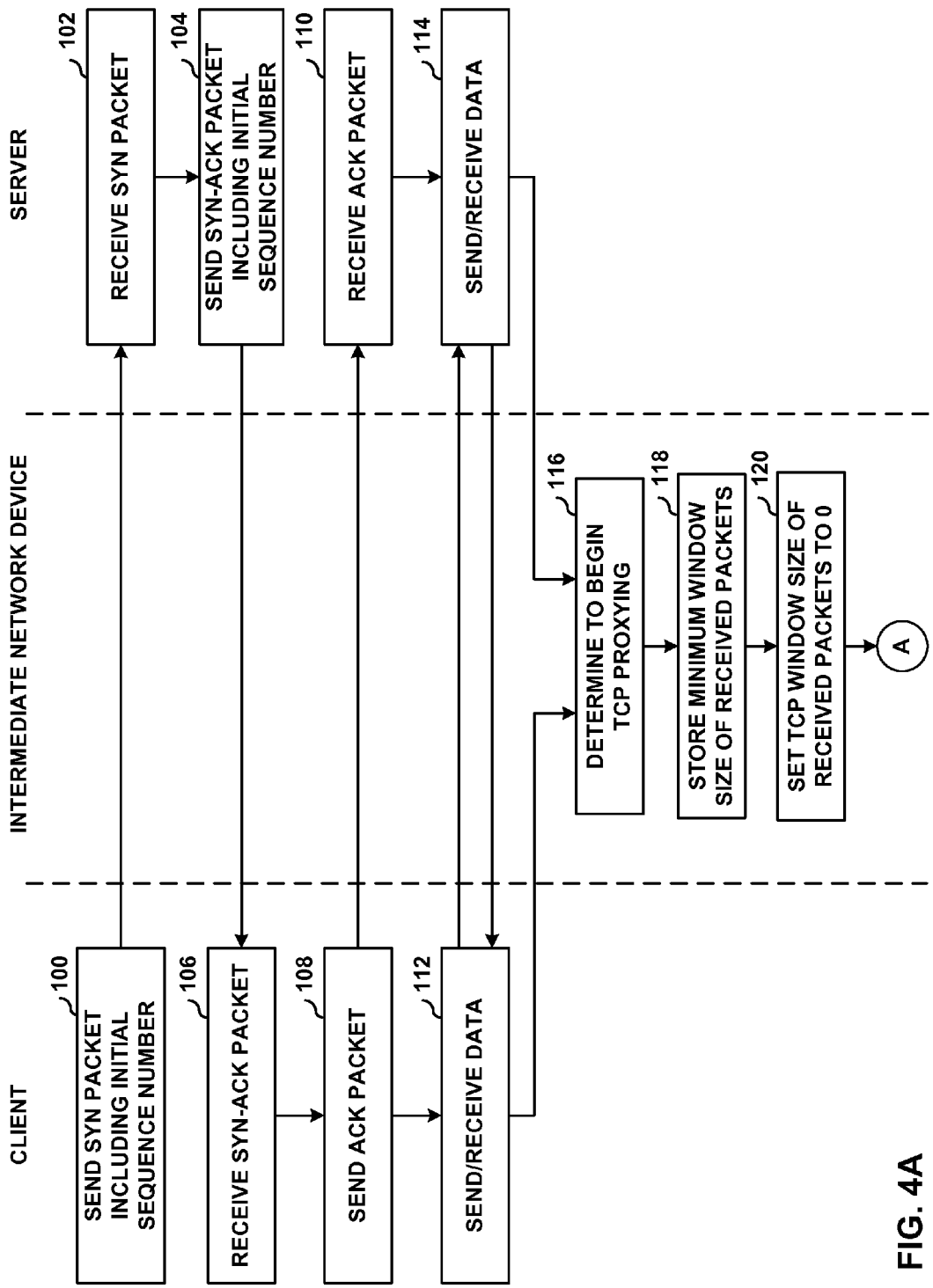
FIGS. 4A and 4B are flowcharts illustrating an example method for beginning TCP proxying of a network session following a TCP 3-way handshake, in accordance with the techniques of this disclosure.
Figure 4B:
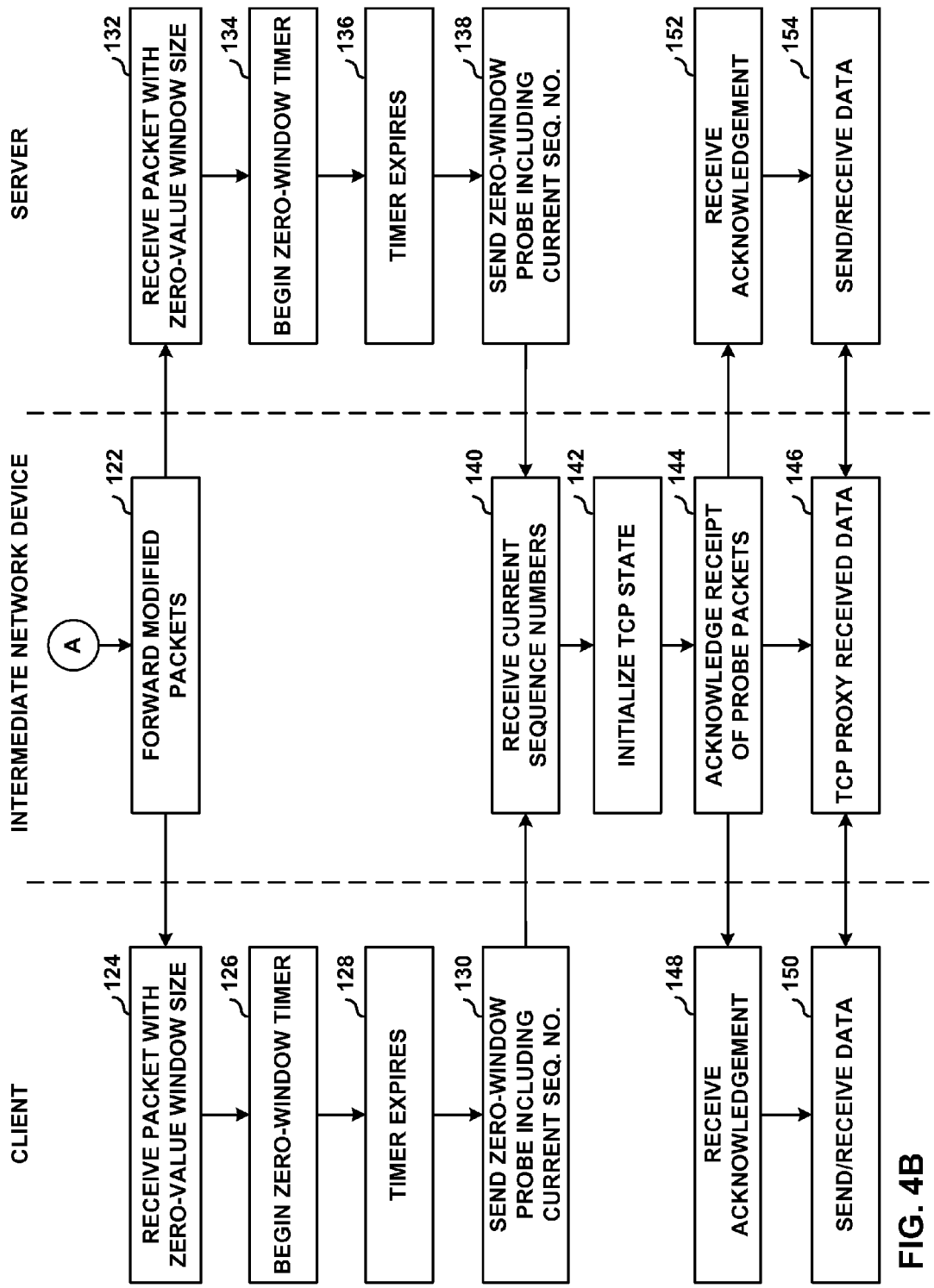

FIGS. 4A and 4B are flowcharts illustrating an example method for beginning TCP proxying of a network session following a TCP 3-way handshake, in accordance with the techniques of this disclosure. Three devices are described as involved in the method of FIGS. 4A and 4B, a client device, an intermediate network device, and a server device. The client device may correspond to one of mobile devices 6, such as mobile device 6B (FIG. 1). The intermediate network device may correspond to mobile gateway 8 (FIG. 1), mobile gateway 9 (FIG. 2), or one of SGWs 22, such as SGW 22B (FIG. 1), which may include components similar to those of mobile gateway 9 (FIG. 2). The server device may correspond to a server device of packet data network 12 (FIG. 1). For purposes of example, the intermediate network device performing the method of FIGS. 4A and 4B is described with respect to mobile gateway 8 (FIG. 1).

Initially, mobile device 6B sends a synchronization (SYN) packet, including an initial sequence number, to the server device (100). This initial sequence number represents the current sequence number of the client-to-server packet flow of a new network session. The server device receives the SYN packet (102) and responds with a SYN-ACK (acknowledgement) packet that includes a separate, initial sequence number (104). The initial sequence number of the SYN-ACK packet represents the current sequence number of the server-to-client packet flow of the network session. The SYN-ACK packet also acknowledges the current sequence number of the client-to-server packet flow. Mobile device 6B then receives the SYN-ACK packet (106) and sends an ACK packet (108), acknowledging the current sequence number of the server-to-client packet flow. The server device also receives this ACK packet (110).

At this point, mobile device 6B and the server device may exchange packets for the network session. For example, mobile device 6B sends and receives data (112), while the server device also sends and receives data (114). To this point, mobile gateway 8 has not utilized the sequence numbers of the network session between mobile device 6B and the server device. For example, mobile gateway 8 may not have received data of the network session, e.g., in the case that mobile gateway 8 acts as a backup network device to a primary network device. Alternatively, mobile gateway 8 may have been receiving data of the network session, but allowing the data to pass through uninspected. At some point, however, mobile gateway 8 determines to begin TCP proxying the data of the network session (116). For example, this determination may be in response to a failover event, due to a trigger being fired, due to a change in configuration data, or based on other determination criteria.

Mobile gateway 8 may then begin storing the minimum of window sizes advertised in received packets of the network session (118). For example, for each packet received of the client-to-server packet flow, mobile gateway 8 may determine whether the advertised TCP window size is smaller than a current minimum client-to-server TCP window size, and if so, update the minimum client-to-server TCP window size based on the advertised TCP window size. Likewise, for each packet received of the server-to-client packet flow, mobile gateway 8 may determine whether the advertised TCP window size is smaller than a current minimum server-to-client TCP window size, and if so, update the minimum server-to-client TCP window size based on the advertised TCP window size. Mobile gateway 8 also modifies the packets of both packet flows, setting a TCP window size of the received packets to 0 (120) before forwarding the packets to their destinations (122), e.g., either mobile device 6B or the server device of packet data network 12.

Mobile device 6B receives one or more packets with a zero-valued window size (124). In response, mobile device 6B sets a zero-window timer, also referred to as a persist timer (126). When the timer expires (128), mobile device 6B sends a zero-window probe packet including a current sequence number for the client-to-server packet flow (130). Similarly, the server device receives one or more packets with a zero-valued window size (132). In response, the server device also sets a zero-window timer, also referred to as a persist timer (134). When the timer expires (136), the server device sends its own zero-window probe packet including a current sequence number for the server-to-client packet flow (138).

Mobile gateway 8 receives the probe packets from both mobile device 6B and the server device, which include both the current client-to-server sequence number and the current server-to-client sequence number, respectively (140). Accordingly, mobile gateway 8 uses the current client-to-server sequence number and the current server-to-client sequence number to initialize TCP state for the network session (that is, for both the client-to-server packet flow and for the server-to-client packet flow). Mobile gateway 8 then acknowledges receipt of the probe packets to mobile device 6B and to the server device (144). Mobile gateway 8 then begins TCP proxying received data (146).

Mobile device 6B receives the acknowledgement from mobile gateway 8 (148) and begins sending and receiving data of the network session (150). In particular, mobile device 6B sends data of the client-to-server packet flow to the server device via mobile gateway 8. Mobile gateway 8, acting as a TCP proxy, acknowledges receipt of this data on behalf of the server device. From the perspective of mobile device 6B, such acknowledgements are indistinguishable from acknowledgements sent from the server device. Similarly, the server device receives the acknowledgement of the probe packet, sent by the server device, from mobile gateway 8 (152) and begins sending and receiving data of the network session (154).

In addition, mobile gateway 8 may also reorder data of both the client-to-server packet flow and the server-to-client packet flow, such that the data of both packet flows is in sequence number order. Mobile gateway 8 may further send the reordered data to another service unit, such as a deep packet inspection service unit.

In this manner, the method of FIGS. 4A and 4B represents an example of a method including sending, by an intermediate network device, packets that advertise a transmission control protocol (TCP) window size of zero bytes to a client device and a server device of an established network session. After sending the packets, the method includes receiving, by the intermediate network device, a first zero-window probe packet from the client device, wherein the first zero-window probe packet includes data representing a first current sequence number for a client-to-server packet flow of the established network session, and a second zero-window probe packet from the server device, wherein the second zero-window probe packet includes data representing a second current sequence number for a server-to-client packet flow of the established network session. The method further includes initializing a first TCP state for the client-to-server packet flow based on the first current sequence number and a second TCP state for the server-to-client packet flow based on the second current sequence number. The method also includes acting, by the intermediate network device, as a TCP proxy for packets following the first zero-window probe packet of the client-to-server packet flow based on the first TCP state and packets following the second zero-window probe packet of the server-to-client packet flow based on the second TCP state.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:

sending, by an intermediate network device, packets that advertise a transmission control protocol (TCP) window size of zero bytes to a client device and a server device of an established network session after a synchronization (SYN) packet, a SYN-ACK (acknowledgement) packet, and an ACK packet of the established network session have been exchanged between the client device and the server device;

after sending the packets, receiving, by the intermediate network device, a first zero-window probe packet from the client device, wherein the first zero-window probe packet includes data representing a first current sequence number for a client-to-server packet flow of the established network session, and a second zero-window probe packet from the server device, wherein the second zero-window probe packet includes data representing a second current sequence number for a server-to-client packet flow of the established network session;

initializing a first TCP state for the client-to-server packet flow based on the first current sequence number and a second TCP state for the server-to-client packet flow based on the second current sequence number; and acting, by the intermediate network device, as a TCP proxy for packets following the first zero-window probe packet of the client-to-server packet flow based on the first TCP state and packets following the second zero-window probe packet of the server-to-client packet flow based on the second TCP state.

2. The method of claim 1, wherein acting as the TCP proxy comprises:
in response to receiving a packet of the client-to-server packet flow:
acknowledging receipt of the packet of the client-to-server packet flow to the client device;
updating the first TCP state based on a sequence number of the packet of the client-to-server packet flow; and
forwarding the packet of the client-to-server packet flow to the server device; and
in response to receiving a packet of the server-to-client packet flow:
acknowledging receipt of the packet of the server-to-client packet flow to the server device;
updating the second TCP state based on a sequence number of the packet of the server-to-client packet flow; and
forwarding the packet of the server-to-client packet flow to the client device.

3. The method of claim 1, further comprising:
sending a first acknowledgement packet to the client device in response to the first zero-window probe packet, wherein the first acknowledgement packet advertises a first non-zero TCP window size; and
sending a second acknowledgement packet to the server device in response to the second zero-window probe packet, wherein the second acknowledgement packet advertises a second non-zero TCP window size.

4. The method of claim 1, further comprising, prior to sending the packets, determining that a separate intermediate network device, acting as a primary TCP proxy for which the intermediate network device is configured as a backup TCP proxy, is no longer active.

5. The method of claim 1, further comprising:
prior to sending the packets, receiving packets of the client-to-server packet flow and the server-to-client packet flow without acting as a TCP proxy for the network session; and
determining, after receiving the packets, that the network session should be TCP proxied,
wherein sending the packets comprises sending the packets based on the determination.

6. The method of claim 5, further comprising performing shallow packet inspection on the received packets, wherein determining comprises determining that the network session should be TCP proxied based on the shallow packet inspection.

7. The method of claim 5, wherein determining comprises at least one of determining that an amount of data passing through the intermediate network device for the network session exceeds a data threshold, that the client device has been involved in malicious network activity with respect to a separate network session, that the network session has been active for a period of time that exceeds a time threshold, and that a data rate for the network session has exceeded a data rate threshold.

8. The method of claim 1, further comprising:
reordering packets of the client-to-server packet flow and the server-to-client packet flow based on the first TCP state and the second TCP state; and
sending the reordered packets to a processor.

9. An intermediate network device positioned between a client device and a server device, the intermediate network device comprising:

a plurality of network interfaces configured to send packets that advertise a transmission control protocol (TCP) window size of zero bytes to a client device and a server device of an established network session after a synchronization (SYN) packet, a SYN-ACK (acknowledgement) packet, and an ACK packet of the established network session have been exchanged between the client device and the server device, and receive a first zero-window probe packet from the client device, wherein the first zero-window probe packet includes data representing a first current sequence number for a client-to-server packet flow of the established network session, and a second zero-window probe packet from the server device, wherein the second zero-window probe packet includes data representing a second current sequence number for a server-to-client packet flow of the established network session; and
a processor configured to initialize a first TCP state for the client-to-server packet flow based on the first current sequence number and a second TCP state for the server-to-client packet flow based on the second current sequence number, and to act as a TCP proxy for packets following the first zero-window probe packet of the client-to-server packet flow based on the first TCP state and packets following the second zero-window probe packet of the server-to-client packet flow based on the second TCP state.

10. The intermediate network device of claim 9, wherein to act as the TCP proxy, the processor is configured to:
in response to receiving a packet of the client-to-server packet flow, acknowledge receipt of the packet of the client-to-server packet flow to the client device, update the first TCP state based on a sequence number of the packet of the client-to-server packet flow, and forward the packet of the client-to-server packet flow to the server device, and
in response to receiving a packet of the server-to-client packet flow, acknowledge receipt of the packet of the server-to-client packet flow to the server device, update the second TCP state based on a sequence number of the packet of the server-to-client packet flow, and forward the packet of the server-to-client packet flow to the client device.

11. The intermediate network device of claim 9, wherein the processor is further configured to send a first acknowledgement packet to the client device in response to the first zero-window probe packet, wherein the first acknowledgement packet advertises a first non-zero TCP window size, and to send a second acknowledgement packet to the server device in response to the second zero-window probe packet, wherein the second acknowledgement packet advertises a second non-zero TCP window size.

12. The intermediate network device of claim 9, wherein the processor is further configured to determine whether a separate intermediate network device, acting as a primary TCP proxy for which the intermediate network device is configured as a backup TCP proxy, is no longer active, and to act as the TCP proxy when the primary TCP proxy is determined to no longer be active.

13. The intermediate network device of claim 9, wherein the processor is further configured to, prior to sending the packets, receive packets of the client-to-server packet flow and the server-to-client packet flow without acting as a TCP proxy for the network session, and determine, after receiving the packets, that the network session should be TCP proxied, and wherein the processor sends the packets based on the determination.

14. The intermediate network device of claim 13, wherein the processor is configured to determine whether the network session should be TCP proxied using shallow packet inspection of the received packets.

15. The intermediate network device of claim 13, wherein the processor is configured to determine whether the network session should be TCP proxied based on at least one of whether an amount of data passing through the intermediate network device for the network session exceeds a data threshold, the client device has been involved in malicious network activity with respect to a separate network session, the network session has been active for a period of time that exceeds a time threshold, and a data rate for the network session has exceeded a data rate threshold.

16. The intermediate network device of claim 9, wherein the processor is further configured to reorder packets of the client-to-server packet flow and the server-to-client packet flow based on the first TCP state and the second TCP state, and send the reordered packets to a second, different processor.

17. The intermediate network device of claim 9, wherein the intermediate network device comprises at least one of a mobile gateway device, a serving gateway (SGW) device, a packet data network (PDN) gateway (PGW) device, a router, a gateway, an intrusion detection and prevention (IDP) device, and a firewall.

18. A non-transitory computer-readable storage medium comprising instructions that, when executed, cause a processor of an intermediate network device to:
send packets that advertise a transmission control protocol (TCP) window size of zero bytes to a client device and a server device of an established network session after a synchronization (SYN) packet, a SYN-ACK (acknowledgement) packet, and an ACK packet of the established network session have been exchanged between the client device and the server device;
after sending the packets, receive a first zero-window probe packet from the client device, wherein the first zero-window probe packet includes data representing a first current sequence number for a client-to-server packet flow of the established network session, and a second zero-window probe packet from the server device, wherein the second zero-window probe packet includes data representing a second current sequence number for a server-to-client packet flow of the established network session;
initialize a first TCP state for the client-to-server packet flow based on the first current sequence number and a second TCP state for the server-to-client packet flow based on the second current sequence number; and
act as a TCP proxy for packets following the first zero-window probe packet of the client-to-server packet flow based on the first TCP state and packets following the second zero-window probe packet of the server-to-client packet flow based on the second TCP state.

19. The non-transitory computer-readable storage medium of claim 18, wherein the instructions that cause the processor to act as the TCP proxy comprise instructions that cause the processor to:
in response to receiving a packet of the client-to-server packet flow:
acknowledge receipt of the packet of the client-to-server packet flow to the client device;
update the first TCP state based on a sequence number of the packet of the client-to-server packet flow; and
forward the packet of the client-to-server packet flow to the server device; and in response to receiving a packet of the server-to-client packet flow:
acknowledge receipt of the packet of the server-to-client packet flow to the server device;
update the second TCP state based on a sequence number of the packet of the server-to-client packet flow; and
forward the packet of the server-to-client packet flow to the client device.

20. The non-transitory computer-readable storage medium of claim 18, further comprising instructions that cause the processor to:
send a first acknowledgement packet to the client device in response to the first zero-window probe packet, wherein the first acknowledgement packet advertises a first non-zero TCP window size; and
send a second acknowledgement packet to the server device in response to the second zero-window probe packet, wherein the second acknowledgement packet advertises a second non-zero TCP window size.

21. The non-transitory computer-readable storage medium of claim 18, further comprising instructions that cause the processor to, prior to sending the packets, determine that a separate intermediate network device, acting as a primary TCP proxy for which the intermediate network device is configured as a backup TCP proxy, is no longer active.

22. The non-transitory computer-readable storage medium of claim 18, further comprising instructions that cause the processor to:
prior to sending the packets, receive packets of the client-to-server packet flow and the server-to-client packet flow without acting as a TCP proxy for the network session; and
determine, after receiving the packets, that the network session should be TCP proxied,
wherein the instructions that cause the processor to send the packets comprise instructions that cause the processor to send the packets based on the determination.

23. The non-transitory computer-readable storage medium of claim 22, further comprising instructions that cause the processor to perform shallow packet inspection on the received packets, wherein the instructions that cause the processor to determine comprise instructions that cause the processor to determine that the network session should be TCP proxied based on the shallow packet inspection.

24. The non-transitory computer-readable storage medium of claim 22, wherein the instructions that cause the processor to determine comprise instructions that cause the processor to at least one of determine that an amount of data passing through the intermediate network device for the network session exceeds a data threshold, that the client device has been involved in malicious network activity with respect to a separate network session, that the network session has been active for a period of time that exceeds a time threshold, and that a data rate for the network session has exceeded a data rate threshold.

25. The non-transitory computer-readable storage medium of claim 18, further comprising instructions that cause the processor to:
reorder packets of the client-to-server packet flow and the server-to-client packet flow based on the first TCP state and the second TCP state; and
send the reordered packets to a processor.

26. A system comprising:
a primary network device configured to receive a synchronization (SYN) packet from a client device of a network session, a SYN-ACK (acknowledgement)

packet from a server device of the network session, and an ACK packet from the client device; and a backup network device configured to receive data of the network session when the primary network device is no longer active after receiving the SYN packet, the SYN-ACK packet, and the ACK packet of the network session, wherein the backup network device is configured to send packets that advertise a transmission control protocol (TCP) window size of zero bytes to the client device and the server device, after sending the packets, receive a first zero-window probe packet from the client device, wherein the first zero-window probe packet includes data representing a first current sequence number for a client-to-server packet flow of the network session, and a second zero-window probe packet from the server device, wherein the second zero-window probe packet includes data representing a second current sequence number for a server-to-client packet flow of the network session, initialize a first TCP state for the client-to-server packet flow based on the first current sequence number and a second TCP state for the server-to-client packet flow based on the second current sequence number, and act as a TCP proxy for packets following the first zero-window probe packet of the client-to-server packet flow based on the first TCP state and packets following the second zero-window probe packet of the server-to-client packet flow based on the second TCP state.

* * * * *